United States Patent [19]

Meshulam

[11] 3,758,221

[45] Sept. 11, 1973

[54] HOLE SAW ASSEMBLY

[75] Inventor: Avram M. Meshulam, Baltimore, Md.

[73] Assignee: The Black and Decker Manufacturing Company, Towson, Md.

[22] Filed: Dec. 29, 1971

[21] Appl. No.: 213,359

[52] U.S. Cl.................. 408/204, 144/20, 144/23
[51] Int. Cl............................................ B23b 51/04
[58] Field of Search................ 408/204, 227, 238, 408/231, 233, 239, 209; 144/21, 22, 23, 24, 20

[56] References Cited
UNITED STATES PATENTS

| 1,645,736 | 10/1927 | Blanch et al.............. | 408/233 X |
| 1,515,548 | 11/1924 | Cerotsky................... | 408/233 X |
| 3,267,975 | 8/1966 | Enders...................... | 408/191 |
| 3,647,310 | 3/1972 | Morse....................... | 408/209 X |
| 2,779,361 | 1/1957 | McKiff...................... | 408/204 X |
| 3,138,183 | 6/1964 | Stewart..................... | 408/231 X |

Primary Examiner—Donald R. Schran
Assistant Examiner—Z. R. Bilinsky
Attorney—Leonard Bloom et al.

[57] ABSTRACT

A hole saw assembly comprising a mandrel adapted to receive a variety of cup-shaped hole saws. The mandrel includes a pilot drill and a spindle adapted to be mounted within the chuck of a power tool. The assembly also includes a lock plate for providing a drive connection between the mandrel and the hole saw.

1 Claim, 3 Drawing Figures

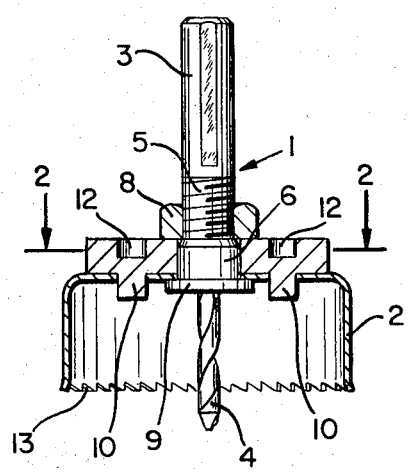
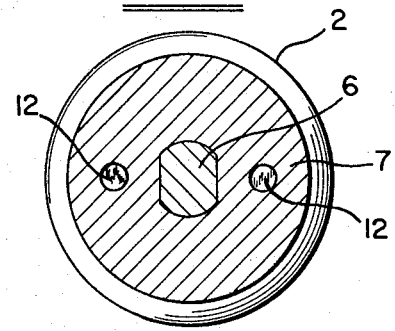
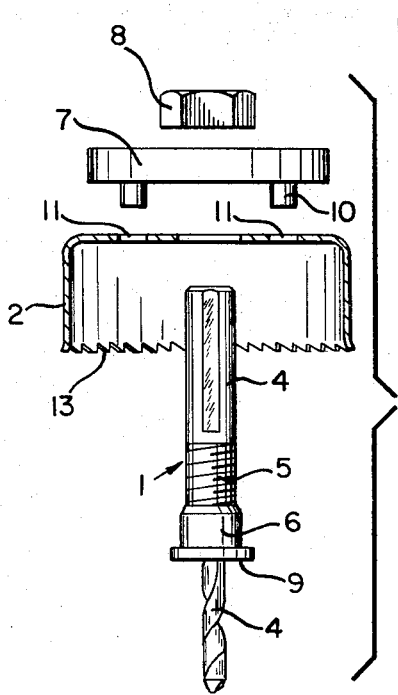
INVENTOR.
AVRAM M. MESHULAM
BY
Edward D. Murphy

HOLE SAW ASSEMBLY

The present invention is directed to an improved hole saw assembly which embodies a simplified means for driving the hole saw from the mandrel.

Previous hole saw assemblies generally include a mandrel and a cup-shaped blade, the mandrel being constructed so as to serve various functions, including coupling to a power source, provision for a centrally mounted pilot drill and means for interchangeable mounting of a variety of cutting blades. The cutting blades may be either mounted for direct driving by the mandrel or by means of an intermediate member or drive plate.

When a drive plate is used to couple the mandrel to the cutting blade, a variety of relatively complex systems have previously been used. For example, U.S. Pat. No. 3,267,975 teaches several such methods in illustrating prior art and also is directed to a specific, improved coupling means.

It is the objective of the present invention to provide a novel and simplified coupling means which avoids the manufacturing complexity inherent in previous designs and which therefore permits the product to be made available to the consumer at a substantially reduced price and improved reliability.

It is also an objective of this invention to provide a hole saw assembly which provides for simple and rapid exchange of saw blades of differing size.

Further objects and advantages of this invention will become apparent as the description and illustration thereof proceed.

In the drawing:

FIG. 1 is a vertical cross sectional view of a hole saw assembly in accord with this invention;

FIG. 2 is a horizontal cross sectional view taken along the line 2—2 of FIG. 1; and FIG. 3 is an exploded plan view of the assembly of FIG. 1.

FIG. 1 illustrates a hole saw assembly which includes a mandrel 1 and a cup-shaded saw blade 2. The mandrel comprises a spindle 3 which is adapted to be engaged and driven by the output member of a power tool such as a chuck. The mandrel also is provided with a pilot drill 4.

The intermediate portion of the mandrel includes a threaded portion 5 and a non-circular drive portion 6 which may, for example, be of the Double D configuration as shown in FIG. 2. A drive plate 7 is engaged with the drive portion 6 and is secured thereon by a nut 8. The lower end of the drive portion 6 terminates in an extended flange 9 which supports the hole saw 2.

In particular accord with the present invention, the drive plate 7 includes a plurality of projections 10 which are received in suitable apertures 11 in the back of the hole saw. These projections serve to transmit the driving torque from the drive plate to the hole saw, the drive plate being coupled to the mandrel via the Double D portion 6 of the mandrel and a matching opening in the center of the drive plate.

In the lock plate shown in the drawing, the projections 10 are formed by coining the material in an appropriately shaped punch and die, thus simply shifting a portion of the material of the drive plate out of the dimples 12 to form the projections 10.

As is clearly illustrated by the exploded view of FIG. 3, this construction enables the manufacturer of hole saws mandrels to make the product with a minimum of manufacturing steps and a minimum of assembly. The pilot drill 4 is, in accord with conventional practice, retained in the mandrel by means of a set screw, not shown. Aside from this, the entire construction consists of simple and easily manufactured parts and without any need for expensive, time consuming assembly.

Despite this simplicity of manufacture of this assembly, the device as assembled is adequate to the demands of the user. The torque is transmitted from the mandrel to the cutting teeth 13 via the Double D drive 6, the drive plate 7 and the projections 10. Although only two projections have been illustrated, more may be provided if required; thus, the drive coupling may be as strong as is required to meet the torque load of a particular application.

A further feature of this invention lies in the simple but secure mounting of the saw blade in the assembly. This arises from the fact that the saw blade apertures 11 are aligned with the projections 10 and then the two-piece assembly is seated tightly against the flange 9 by the nut 8. It is also permissible, within the context of this construction, to extend the length of the Double D drive portion 6 so that the nut 8 tightens against the shoulder of portion 6 just before it would tighten against the drive plate 7. This mode of construction may be important in applications where it is desired that the saw blade float or wobble slightly in an axial direction rather than being securely seated against the flange 9.

While a specific embodiment of the present invention has been shown and described, it will be obvious to those skilled in the art that many modifications can be made without departing from the true spirit of this invention. Accordingly, it is intended that appended claims cover all such modifications.

I claim:

1. A hole saw assembly comprising
   a mandrel, said mandrel including a drive portion, a threaded portion, a non-circular coupling portion and a shoulder means;
   a hole saw for assembly with said mandrel, said hole saw comprising a tubular cutting blade and a backing plate for engagement with said shoulder on said mandrel, said backing plate including a central aperture therein for passing over said mandrel, said backing plate having a plurality of apertures therein;
   a drive plate for coupling said mandrel to said hole saw, said drive plate comprising a generally planar member having a non-circular aperture therein complementary to said non-circular portion of said mandrel, said drive plate further comprising a plurality of integral projections adapted to be engaged with said apertures in said backing plate, said projections in said drive plate comprising integral stud portions of said drive plate formed by the displacement of the material by embossing of said drive plate, the cross sectional area of each of said stud portions in a plane parallel to said backing plate being congruent to each of the apertures in said backing plate; and
   means for engagement with said threaded portion of said mandrel for retaining said drive plate and said backing plate between said shoulder and said last-mentioned means.

* * * * *